Nov. 20, 1962     W. SHRINER     3,064,657
CIGARETTE SMOKE FILTRATION DEVICE
Filed May 19, 1961     2 Sheets-Sheet 1
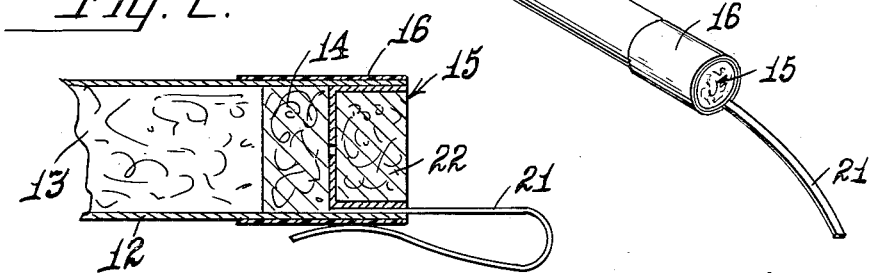
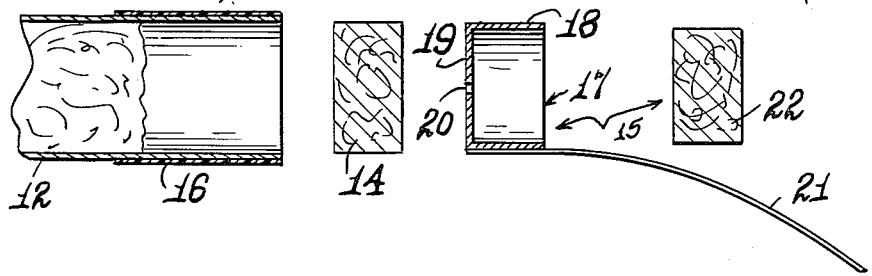
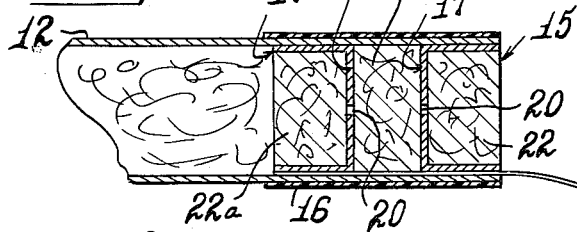
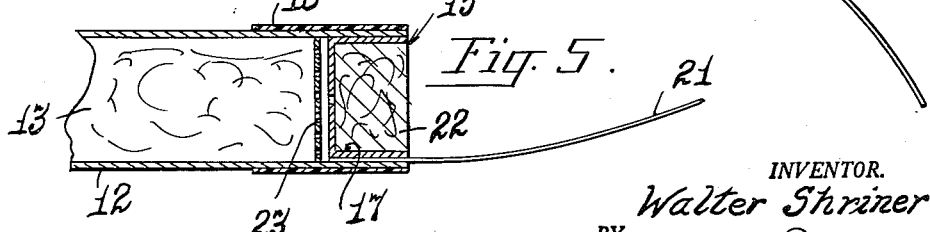
INVENTOR.
Walter Shriner
BY Charles N. Ledman
Attorney.

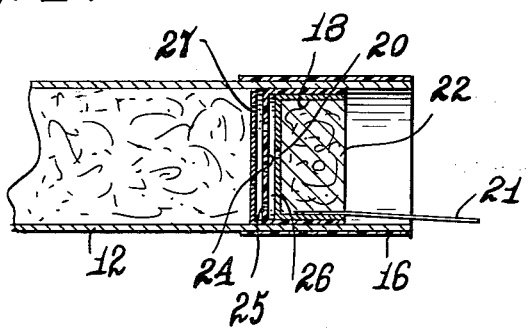
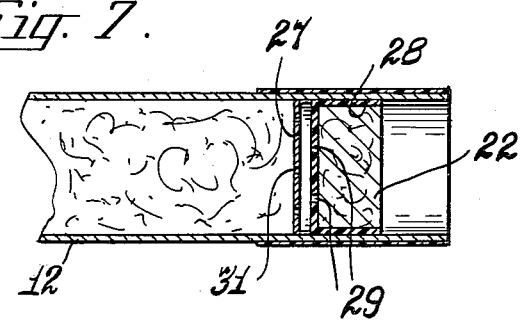

United States Patent Office 3,064,657
Patented Nov. 20, 1962

3,064,657
CIGARETTE SMOKE FILTRATION DEVICE
Walter Shriner, 1133 S. 2nd St., Springfield, Ill.
Filed May 19, 1961, Ser. No. 111,223
8 Claims. (Cl. 131—10)

The present invention relates to improvements in a method of and means for smoke filtration and is more particularly concerned with the novel construction and assembly of a filter device for a cigarette mouthpiece and which comprises a novel filter insert arranged within the end of the cigarette which is received in the mouth and a related mouthpiece construction which functions to generate and retain an electrostatic charge that is effective to increase the absorption or tar accumulation effect of the insert. The invention also includes novel means to retard the flow of the smoke stream to the mouthpiece and to cause it to follow an indirect path so as to cause entrapment of much of the solids therein.

The present invention, in one of its embodiments, utilizes the principle of establishing an electrostatic charge in the insert or filter element so as to increase precipitation and entrapment of the molecules of tobacco tar and nicotine from a stream of smoke passing therethrough and it is therefore an object of the invention to provide a novel filtration device utilizing such principle.

Another object is to provide a cigarette mouthpiece with at least its exterior surface coated or otherwise provided with material capable of receiving an electrostatic charge at the time of use and which is associated with a novel filter insert in such manner as to impart such charge to the filter insert.

Another object is to provide a novel filter element of a nature that will receive and retain an induced electrostatic charge.

Another object is to provide a cigarette filter with novel structural characteristics that affords physical entrapment of solids contained in the smoke stream passing therethrough.

Another object is to provide a porous filter element which can be produced in quantities and incorporated with a cigarette during the manufacture thereof by commercially practical methods at negligible expense and which will permit the cigarette to draw naturally and which will not change the taste to which the smoker is ordinarily accustomed.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 1 is a perspective view of a cigarette embodying features of the invention.

FIG. 2 is an enlarged longitudinal sectional view of the mouthpiece end of the cigarette shown in FIG. 1.

FIG. 3 is an exploded sectional view of the mouthpiece end of the cigarette.

FIG. 4 is a sectional view similar to FIG. 2, showing a modified form of mouthpiece construction.

FIGS. 5, 6 and 7 are sectional views similar to FIG. 4, showing other embodiments of the invention.

Referring to the exemplary embodiment of the invention illustrated in FIGS. 1, 2 and 3, the cigarette 11 includes the usual cylindrical wrapper 12 and tobacco filler 13 which terminates short of the mouthpiece end of the cigarette to accommodate plugs or inserts 14 and 15.

The mouthpiece end of the cigarette has its external surface coated with a cellulosic material 16, such as polystyrene or other plastic material of a kind that is capable of receiving an induced electrostatic charge upon the application of friction, as by rubbing same against a piece of dry cloth.

The plug or insert 15, best shown in FIG. 3, comprises a cylindrical cup 17, including a cylindrical wall 18 having an outside diameter to fit snugly within the mouthpiece end of the cigarette, and an end wall 19 having at least one orifice 20 therein. The cup 17 is made of thin metal foil, such as aluminum, which has high electric conductivity and it has attached to it a foil strip 21. A filter element 22 of loosely packed cotton, or other suitable filter material, is inserted within the cup 17.

In assembly, the plug 14 which also is comprised of filter material, such as loosely packed cotton or cellulose filter material, is placed in the mouthpiece end of the cigarette and in contact with the tobacco filler therein. The plug or insert 15 then is telescoped into place over plug 14 with its open end disposed toward the open end of the cigarette mouthpiece and with the attached foil strip 21 protruding outwardly beyond said end.

When the cigarette is to be used, the free end of the metal foil strip 21 is held against the cellulosic coating 16 on the mouthpiece end of the cigarette and said mouthpiece end is brushed lightly against or by a dry cloth. This induces a frictionally produced electrostatic charge on the cellulosic material 16 which is conveyed via strip 21 to foil cup 17. Ordinarily, a few brisk rubs are sufficient, and the foil strip 21 is then torn or otherwise removed allowing the residual charge to remain trapped on the foil cup.

Applicant has found that when smoke of a lighted cigarette is drawn through filter plug 14, orifice 20 and filter element 22, there is precipitation of the molecules of tobacco tar which accumulate on the charged surface of the end wall 19 of foil cup 17 in the area of the orifice or orifices 20 therein and that the body of filter element 22 is practically free of any precipitated tar. Obviously, the size of the inserts 14 and 15 may be varied to afford a capacity approximating the tar content of the specific tobacco used in the cigarette.

In the FIG. 4 illustration, wherein like numerals are used to identify parts corresponding to the FIG. 3 disclosure, the mouthpiece end of the cigarette has a second foil cup 17a and contained filter element 22a arranged therein inwardly of filter plug 14. In this instance, both cups 17—17a are connected with foil strip 21 and the inner cup 17a has its end wall 19 disposed toward filter plug 14 and may have one or a plurality of orifices 20 therein. An assembly such as this has greater tar absorption capacity.

Another embodiment of the invention is disclosed in FIG. 5, wherein like numbers also are used to identify corresponding parts. Here the filter plug 14 disclosed in the previously described embodiments is omitted and is replaced by a disc 23 of porous paper or non-porous paper having orifices therein. The disc 23 serves as a maximum barrier for tobacco tars and nicotine and any tars passing therethrough are precipitated on the charged foil cup 17. In this embodiment, the degree of porosity of disc 23 can be varied to completely eliminate the passage of anything but warm air through the mouthpiece and of the cigarette or to allow varying degrees of smoke passage but, in all instances, any tars passing therethrough are precipitated on the charged foil cup 17.

In the FIG. 6 disclosure, which is essentially like the disclosure of FIG. 5, a plastic shield 24 has been fitted over the foil cup 18 and said shield is provided with one or more openings 25 which preferably are offset with respect to opening 20 in foil cup 18 so as to cause the smoke stream to follow a tortuous path before reaching the filter material 22. Spacing of the plastic cup from foil cup 18 provides a circular chamber 26 between the bottom walls thereof which acts as an expansion chamber for the smoke passing therethrough and results in the deposit of the heavier of said solids onto the walls surrounding said space, whereas the electrostatic action of the foil cup 18 effectively restrains passage of remaining solids into the filter material 22. Also, if desired, a thin apertured cellulose filter or washer 27 may be arranged inwardly of shield 24 to increase solid precipitation. It is preferable that the filter assembly be recessed from the end of the mouthpiece so as to minimize moisture absorption and resultant loss of the electrostatic charge in foil cup 18.

In the FIG. 7 structure, the foil cup has been replaced by a plastic cup 28 that has its bottom wall formed with one or more apertures 29 through which the smoke stream will flow after passing through apertures 31 in the thin cellulose filter or wafer 27 spaced inwardly of said cup. This assembly will function to a high degree of efficiency without the aid of the electrostatic charge applied to the other filter assemblies hereinabove described. This is because of the high degree of filtration that results from the venturi-vortex action of the specific structure, which is also present in the aforesaid structures as ancillary to the electrostatic action therein present.

Another variation in the embodiments hereinabove described is to omit the filter element 22 from the foil cup 17 or plastic cup 28, thus affording an assembly wherein tar precipitation on the cups is relied upon for effective tar removal without further filtering.

It should be apparent that applicant has disclosed novel structures, the components of which may be adjusted or varied to afford minimal or maximum tar removal thus rendering the principles herein disclosed applicable for incorporation in industrial smoke control apparatus. In such installations an electrostatic charge may be maintained on the foil element by the application of electric current from an outside current source.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

What I claim and desire to secure by Letters Patent of the United States is:

1. In a mouthpiece for cigarettes and the like including a cellulosic film on the outside surface of said mouthpiece, a filler arranged within said mouthpiece, said filler comprising a foil cup having at least one orifice in its bottom wall and through which smoke of a burning cigarette must pass, an electrical conductor on said cup adapted to convey an electrostatic charge imposed on the cellulosic film to said foil cup, said conductor being removable, an absorbent filter element mounted in said cup and a second absorbent filter element in said mouthpiece inwardly of said cup.

2. In a mouthpiece for cigarettes and the like including a cellulosic film on the outside surface of said mouthpiece, a filler arranged within said mouthpiece, said filler comprising a foil cup having at least one orifice in its bottom wall and through which smoke of a burning cigarette must pass, an electrical conductor on said cup adapted to convey an electrostatic charge imposed on the cellulosic film to said foil cup, said conductor being removable, and an absorbent filter element mounted in said cup.

3. In a mouthpiece for cigarettes and the like including an electrically chargeable film on the outside surface of said mouthpiece, a filler arranged within said mouthpiece, said filler comprising a foil cup having at least one orifice in its bottom wall and through which smoke of a burning cigarette must pass, an electrical conductor connected to said cup and adapted to convey an electrostatic charge imposed on said film to said foil cup, said conductor being removable, and an absorbent filter element in said mouthpiece inwardly of said cup.

4. In a mouthpiece for cigarettes and the like including a cellulosic film on the outside surface of said mouthpiece, a filler arranged within said mouthpiece, said filler comprising a foil cup having at least one orifice in its bottom wall and through which smoke of a burning cigarette must pass, an electrical conductor connected to said cup and adapted to convey an electrostatic charge imposed on the cellulosic film to said foil cup, and an absorbent filter element mounted in said cup, and a second absorbent filter element in said mouthpiece inwardly of said cup.

5. In a mouthpiece for cigarettes and the like including a cellulosic film on the outside surface of said mouthpiece, a filler arranged within said mouthpiece, said filler comprising a foil cup having at least one orifice in its bottom wall and through which smoke of a burning cigarette must pass, and an electrical conductor on said cup adapted to convey an electrostatic charge imposed on the cellulosic film to said foil cup.

6. In a cigarette, a cellulosic film on the outside surface of the mouthpiece end of said cigarette, a filler arranged within said mouthpiece, said filler comprising a foil body having a cup with at least one orifice therein and through which smoke of a burning cigarette must pass, an electrical conductor on said body adapted to convey an electrostatic charge imposed on the cellulosic film to said foil body cup, said conductor being removable, and an absorbdent filter element contained in said body.

7. A mouthpiece for a cigarette and the like comprising a filler imposing a resistance to the passage of smoke and having an electrostatic charge for precipitating tobacco tar from smoke passing therethrough, a cellulosic film on the outside surface of said mouthpiece, and separate electrical conductive means to convey an induced electrostatic charge from the cellulose film to the filler.

8. The mouthpiece described in claim 7 in which the filler comprises a perforated metal foil cup having filter material therein.

References Cited in the file of this patent

UNITED STATES PATENTS

| | | |
|---|---|---|
| 2,827,903 | Niederman | Mar. 25, 1958 |
| 2,916,038 | Wade | Dec. 8, 1959 |
| 2,954,778 | Lebert | Oct. 4, 1960 |

FOREIGN PATENTS

| | | |
|---|---|---|
| 760,772 | Great Britain | Nov. 7, 1956 |